Patented Apr. 16, 1935

1,998,098

UNITED STATES PATENT OFFICE 1,998,098

PROCESS OF PREPARING AIR-DRYING VARNISHES FROM PHENOL-ALDEHYDE CONDENSATION PRODUCTS

Fritz Seebach, Erkner, near Berlin, Germany, assignor to Bakelite Gesellschaft mit beschrankter Haftung, Berlin, Germany No Drawing. Application March 10, 1931, Serial No. 521,509. In Germany March 28, 1930

7 Claims. (Cl. 260—4)

It is known that varnishes containing solutions of phenol-aldehyde resins form films by mere air-drying, and consequently with the elimination of the usual hardening by heat, which films do not offer great resistance to mechanical handling and are readily attacked by solvents, as well as by alkalies. It is in fact usually quite difficult in the case of films which are produced from solutions of phenol-aldehyde resins to secure the necessary hardness and elasticity, when heat treatment is omitted.

It has now been found that hard, elastic and resistant air-drying varnishes can be produced in an astonishingly simple manner from phenol-aldehyde resins, if the procedure outlined below is followed.

It is known that phenol-aldehyde condensation products can be converted, i. e., advanced to a less fusible and soluble state by means of acid anhydrides and acid chlorides. Coatings prepared from products converted in this manner exhibit very little hardness, and resistance to solvents, and the property of air-drying is completely absent.

In contrast it has been found that the compounds of phenol-aldehyde resins and air-drying oils, made in accordance with pending patent applications 446,794 filed April 23, 1930, and 427,993 filed February 12, 1930, can be transformed by organic acid anhydrides or acid chlorides into products which, when applied as coatings, give air-drying films resistant to solvents and to alkalies.

According to application 427,993 synthetic resinous products of a hardenable nature from phenols and aldehydes in their fusible and soluble initial condition are combined preferably in the presence of solvents, with air drying or fatty oils that have been oxidized or partially oxidized. The application 446,794 describes the preparation of products from a hardenable phenol-aldehyde resin (or its equivalent) and tung oil by heating them together in the presence of a suitable solvent.

The conversion of the compounds, formed according to the aforesaid patent applications is attained with astonishing ease and a reaction obviously takes place between the hydroxyl groups of the phenol-aldehyde resins and the acid anhydrides or acid chlorides. The resins obtained by the transformation are very readily soluble in the usual solvents of the varnish art, for example, oil of turpentine. They dry very rapidly in air and exhibit greater hardness than copal or amber lacquers. In their air-dried state they are sufficiently resistant to organic solvents and completely resistant to soda lye. The resistance to lye (and by the term lye are meant the solutions of the free caustic alkalies such as NaOH or KOH) is so marked that the lyes do not even affect the freshly-applied coating.

Example 1

100 parts resole are reacted by heating according to the process of patent application 446,794, with 100 parts tung oil and 200 parts of a solvent, such as cyclohexanol. The solvent is distilled off in vacuum except for a few percent, which may remain in the mixture. Then 100 parts of acetic anhydride are added and the solution is boiled for about 2 hours. The acetic acid formed and the unconverted acetic anhydride are then removed as completely as possible by distillation in vacuo. The residue may be again dissolved in the cyclohexanol, which was distilled over in the first operation. Only a small fraction of the cyclohexanol need be added and again distilled off, so that the last traces of acetic anhydride disappear. The resin is soluble in an alcohol-benzol mixture, in benzol or in turpentine.

Example 2

75 parts of resole are reacted by heat with 75 parts of tung oil, in presence of 150 parts of a solvent such as cyclohexanol; the solvent is distilled off in vacuo and the residue is emulsified in a solution of 40 grams of caustic soda and 210 grams of water and reacted with 100 grams of benzoyl chloride. The reaction product is then washed in water until a neutral reaction is arrived at and dissolved in cyclohexanol or turpentine oil.

Example 3

The process is carried out as in Example 1, but as soon as the resole has been combined with the tung oil, gaseous sulfurous acid is allowed to pass through the liquid while still hot in proportion of about 5–100 ccm. of gaseous $SO_2$ to each kilo of solution. The solvent is then distilled off as in Example 1. Prior to distilling off the solvent, carbonic acid gas may be passed through the solution for some time, thereby removing any excess of catalyst from the solution. Acetic anhydride is added in the same proportion as in Example 1 with sufficient precaution, preferably in portions, in order to avoid too vehement reaction. The process is then continued as in Example 1.

It is also possible to dissolve or suspend the compound of the resole and an air-drying oil, such as tung oil, in alkali, and then to transform the compound with an acid chloride such as benzoyl chloride. The resinous conversion product is separated off, washed, and dissolved in a solvent.

The conversion with acid chlorides or acid anhydrides may be accelerated by using catalysts. It is well known that acids, such as sulfuric acid or sulfo-acetic acid, act as accelerators in the process of acetylating. The acids to be used as catalysts must, as a rule, be removed from the conversion product, and consequently those acids are used as accelerators, which may be removed readily. For example, the reaction between acetic anhydride and the hydroxyl groups of resin-oil compounds may be accelerated by passing a small quantity of sulfurous acid through the solution of the resin-oil compounds in a solvent, for a short time at normal or elevated temperature. The resin-oil compounds thus treated are converted so vigorously by acetic anhydride that it is necessary to add the acetic anhydride during the reaction in a thin stream at most. In place of sulfurous acid, gaseous hydrochloric acid may be used as the accelerator. This sulphurous or hydrochloric acid may again be driven off by a current of $CO_2$. Several catalysts mixed together, or several catalysts used one after the other, may also be employed. In addition to the acids, anhydrous sodium acetate can also be used as an accelerator.

As starting substances, according to the present invention, all of the compounds of phenol-aldehyde condensation products and air-drying oils, made according to the applications mentioned, can be used. As acid anhydrides or chlorides, the anhydrides or chlorides of aliphatic or aromatic acids may be used, for example, acetic anhydride, the mixed anhydride of formic and acetic acids, benzoyl chloride, fatty acid chlorides, such as the chlorides of palmitic, stearic or adipic acids, etc. It is also possible to use a mixture of several acid anhydrides or acid chlorides. These compounds are used in such amount that the reaction with the hydroxyl groups of the phenol-aldehyde condensation products is as complete as possible. The materials remaining unchanged in the reaction and any by-products formed, are removed from the conversion product, as for example by distillation.

The final products may be used as varnishes either with or without the addition of driers. Other natural or synthetic resins may be added to the varnishes at any convenient stage of the manufacture, as long as these resins do not affect the air-drying. The conversion products, made according to this invention, may also be subjected to a hardening by heat, or, when necessary, fillers, organic or inorganic dyes, etc. are mixed with them, they may be used in the customary way for the production of laminated products or molded objects or to impregnate porous materials, etc.

The varnishes serve for instance as outer coatings of every kind, for example, on wood, stone or metal, on ships' bottoms, to impregnate for example sail-cloth, rolls of paper or other porous materials, laminated or non-laminated, for lacquering of apparatus or parts of apparatus attacked by alkalies, etc.

The term "compounds" used in the description and claims with reference to the products obtained from phenol-aldehyde resins and air-drying fatty oils is to be understood as definitive of products such as result from an interaction of resins and oils of the character described in the copending applications mentioned above.

What I claim is:

1. Process of preparing a reaction product from a compound of a heat-hardening phenol-aldehyde resin and air-drying fatty oil, characterized by the fact that said compound is reacted with a member of the group consisting of carboxylic acid anhydrides and carboxylic acid chlorides.

2. Process according to claim 1, characterized by using catalysts.

3. Process of manufacturing the reaction product, obtained according to claim 1, into air-drying varnish, characterized by the fact that the product is dissolved in suitable solvents.

4. Composition comprising the compound of a heat-hardening phenol-aldehyde resin and an air-drying fatty oil, reacted with a member of the group consisting of carboxylic acid anhydrides and carboxylic acid chlorides.

5. Coating composition comprising in solution the compound of a heat-hardening phenol-aldehyde resin and an air-drying fatty oil, reacted with a member of the group consisting of carboxylic acid anhydrides and carboxylic acid chlorides.

6. Process of preparing a reaction product from a compound of a heat-hardening phenol-aldehyde resin and an air-drying fatty oil characterized by the fact that the compound is reacted with carboxylic acid chloride in the presence of an alkali.

7. Composition comprising the compound of a heat-hardening phenol-aldehyde resin and an air-drying fatty oil reacted with a carboxylic acid chloride in the presence of an alkali.

FRITZ SEEBACH.